Jan. 25, 1966  W. H. FENGLER  3,230,836
ANALOG MAGNETIC TAPE-CONTROLLED MACHINE
Filed May 6, 1964  3 Sheets-Sheet 1

INVENTOR
WERNER H. FENGLER.
BY Barthel & Bugbee
ATTORNEYS

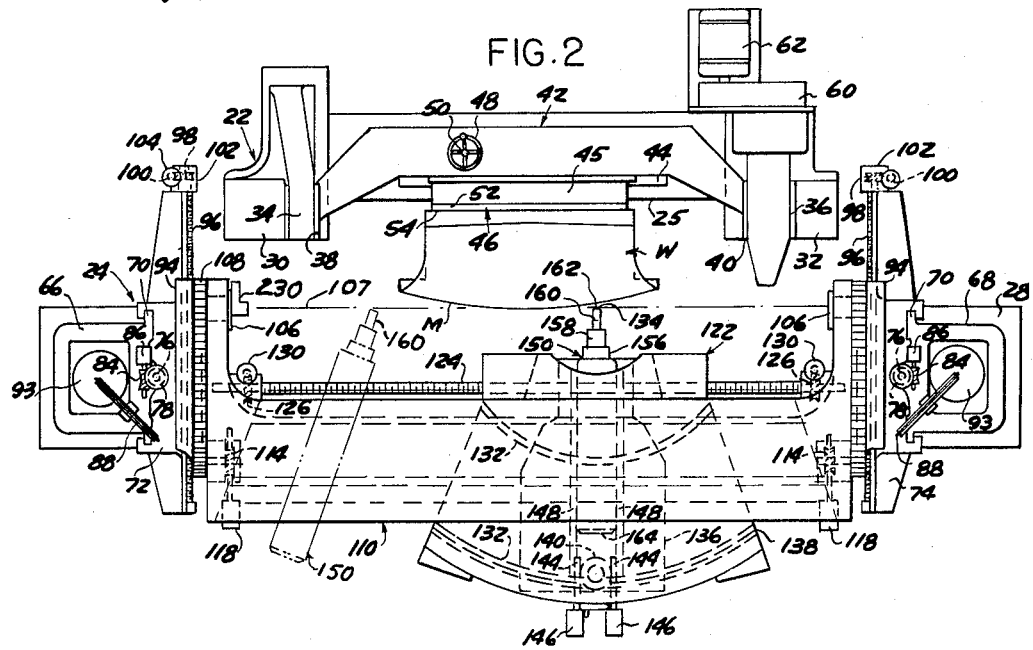
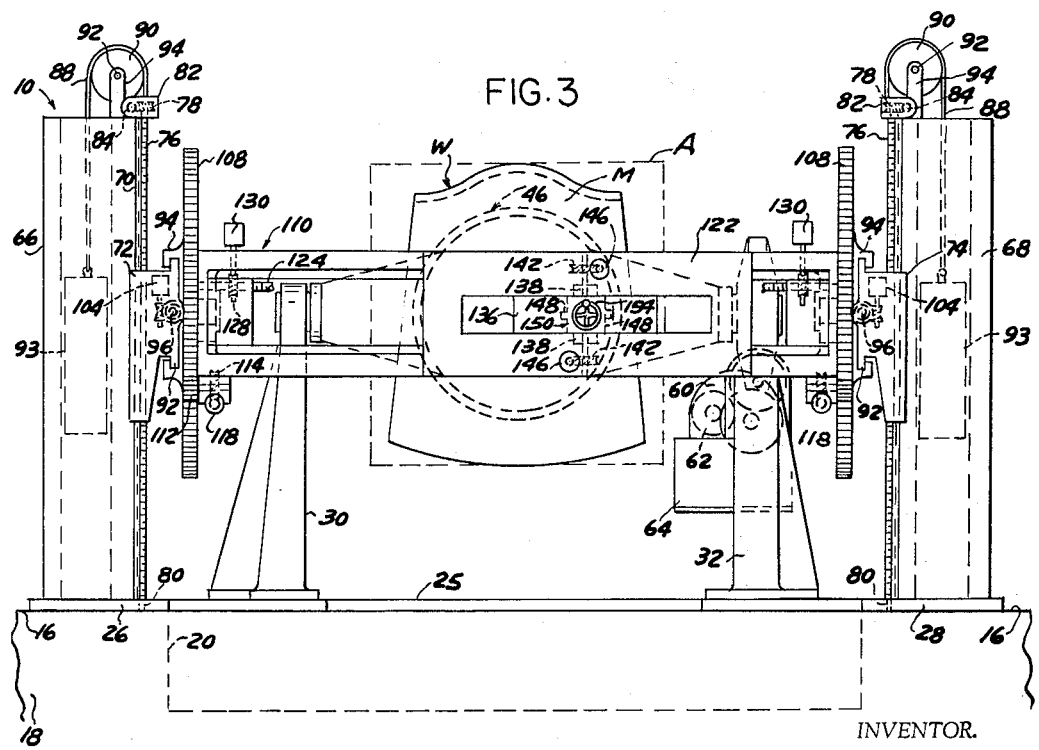

Jan. 25, 1966 W. H. FENGLER 3,230,836
ANALOG MAGNETIC TAPE-CONTROLLED MACHINE
Filed May 6, 1964 3 Sheets-Sheet 3

INVENTOR.
WERNER H. FENGLER
BY
Barthel & Bugbee
ATTORNEYS

United States Patent Office 3,230,836
Patented Jan. 25, 1966

3,230,836
ANALOG MAGNETIC TAPE-CONTROLLED
MACHINE
Werner H. Fengler, 23651 Fordson Drive,
Dearborn, Mich.
Filed May 6, 1964, Ser. No. 365,249
16 Claims. (Cl. 90—13.5)

This invention relates to machine tools and, in particular, to magnetic-tape-controlled machine tools.

One object of this invention is to provide a magnetic-tape-controlled machine tool which will reproduce predetermined contours upon a workpiece in response to instructions contained in a magnetic tape made from accurate scale drawings of the workpiece to be produced, with the various feeding and positioning motions of the machine tool altered whenever ordered to do so by the magnetic tape, in an instantaneous and stepless manner.

Another object is to provide a magnetic-tape-controlled machine tool of the foregoing character wherein the workpiece is mounted upon a tiltable turntable, the tilt of which is regulated by a motor which in turn is controlled by the magnetic tape.

Another object is to provide a magnetic-tape controlled machine tool of the foregoing character wherein the cutter which shapes the contour of the workpiece is mounted upon a horizontally angularly-swingable cross slide which in turn is movable along an elongated beam mounted for vertical swinging on coaxial trunnions, the horizontal axis of which coincides with the tip of the cutting tool, the swinging of the cross slide and of the beam being controlled by motors responsive to instructions received from the magnetic control tape.

Another object is to provide a magnetic-tape-controlled machine tool as set forth in the object immediately preceding, wherein the trunnions pivotally supporting the beam are themselves mounted on saddles which are vertically slidable upon two laterally spaced upright columns, the vertical motion of the saddles being effected by motors operating in response to instructions received from the magnetic control tape.

Another object is to provide a magnetic-tape-controlled machine tool of the foregoing character wherein the axis of the cutting tool, such as an end mill, is maintained accurately radial to the instantaneous surface curvature of the workpiece as the latter is being machined in response to instructions from the magnetic tape, the horizontal angle beta between the axis of rotation of the cutting tool and a vertical plane perpendicular to the trunnion axis and the vertical angle alpha between the axis of rotation of the cutting tool and a horizontal plane through the trunnion axis being varied and controlled continuously from instructions received from the magnetic control tape.

Other objects and advantages of the invention will become apparent during the course of the following description of the accompanying drawings, wherein:

FIGURE 2 is a top plan view of the magnetic-tape-controlled machine tool of FIGURE 1 with the external control system omitted and with the base plate omitted to simplify the showing;

FIGURE 3 is a front elevation of the magnetic-tape-controlled machine tool of FIGURE 1, with the external control system omitted and with the maximum working area of the cutting tool indicated by dotted lines designated "A";

Figure 1:
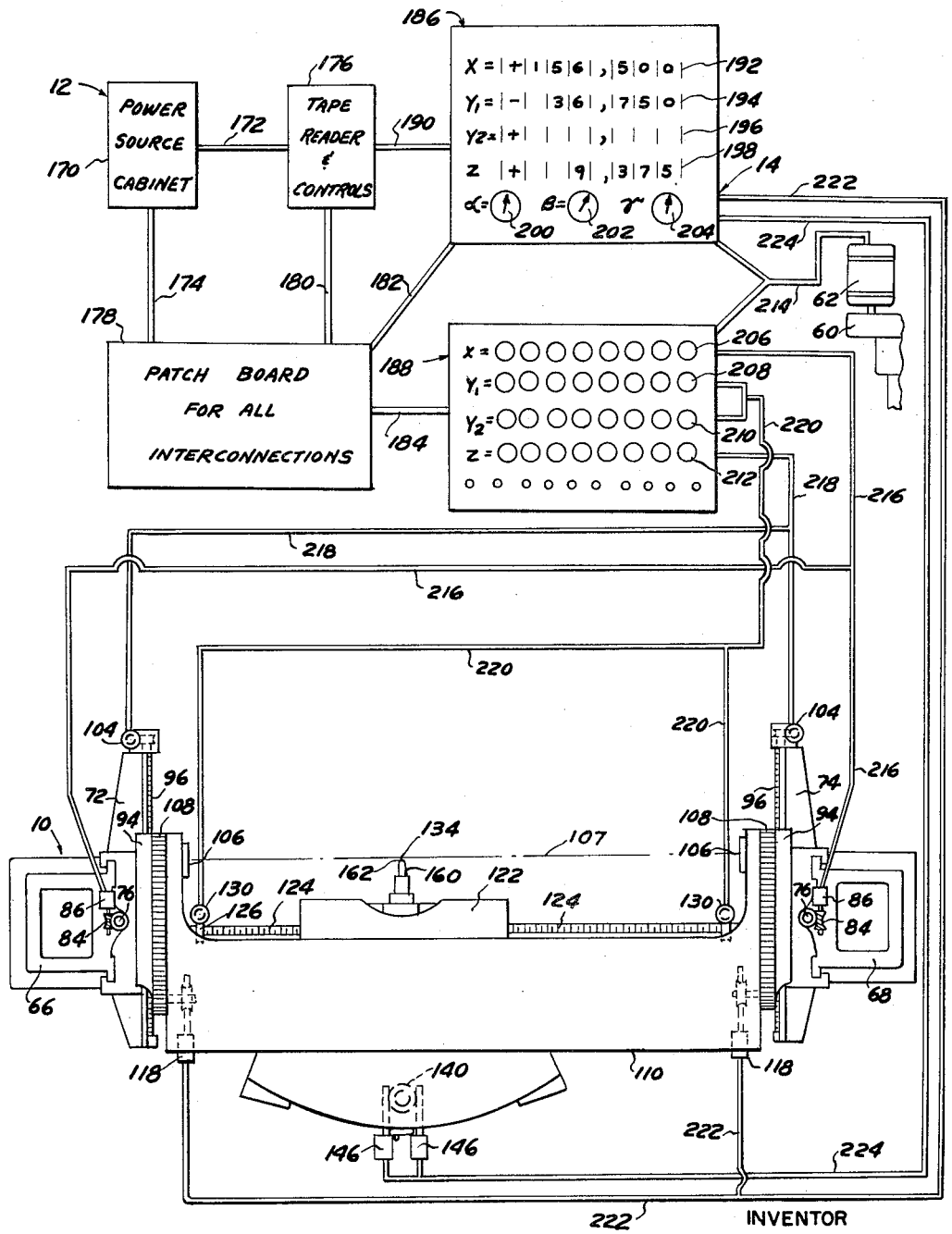
FIGURE 1 is a top plan view of a magnetic-tape-controlled machine tool, according to one form of the invention, showing the external control circuit connected thereto and with the work holder and base plate omitted to simplify the disclosure.

In my co-pending application, Serial No. 340,983 filed January 29, 1964, for Method and Apparatus for Producing Machine-Tool-Controlling Magnetic Tapes Directly from Drawings, I have disclosed and claimed an apparatus whereby a magnetic control tape is produced directly from aligned views of accurate scale drawings of the workpiece through the instrumentality of a tape recorder-producing circuit including photoelectric line followers simultaneously traversing the various lines of the several views at simultaneously corresponding points, the positions of the line followers with respect to predetermined X, Y and Z rectangular coordinates being recorded in the various channels of the magnetic tape in terms of the number of electrical impulses making up the dimensions traversed along the respective coordinates from the origins thereof.

The present invention utilizes the multi-channel magnetic control tape thus produced to control the motions of the machine tool set forth in the foregoing objects in accordance with instructions received from the magnetic tape in terms of the same recorded electrical impulses. In this manner, the present invention carries out the machining of the configuration of the surface of a workpiece exactly in conformity with the drawings thereof as transmitted through the intermediate agency of the multi-channel analog magnetic control tape, either upon the same scale as the drawings or, by known methods of electronic enlargement or reduction, upon a desired larger or smaller scale. This it accomplishes without the necessity of using a large computer, as in certain prior systems. The machine tool of the present invention is in effect a vertical milling machine or router so constructed and controlled that the end mill or rotary cutting tool is maintained automatically with its axis perpendicular or radial to the surface being cut.

To bring this about, the cutter is automatically steered so that its cutting edge where it meets the axis or center line of rotation is always on the point in space where the X, Y and X axes of the rectangular coordinates intersect each other (FIGURES 5 and 6), these axes being the reference axes relatively to which the data on the magnetic tape have been recorded, as set forth in my said co-pending application Serial No. 340,983. This maintaining of the axis of the cutting tool constantly perpendicular or radical to the workpiece surface being cut also necessitates continuously changing the approach angle in such a way that the cutting edge of the rotary cutting tool is maintained constantly tangential to the point on the workpiece surface, whether flat, regularly curved or irregularly curved, designated by the intersecting point of all three coordinate axes. In this manner, a die model or die can be quickly and accurately machined in response to constantly changing instructions received from the magnetic machine-control tape. This procedure for forming convex or male dies or punches can also be used for forming the female or concave die by changing the length of the rotary cutter to extend past the intersection of the X, Y and Z coordinate axes so as to make allowance for the thickness of the sheet metal to be stamped out by the dies, and, reversing the image through switching of the circuits, the female die can likewise be machined from the same magnetic machine-control tape since the approach angles would remain the same.

Machine tool construction

Figure 4:
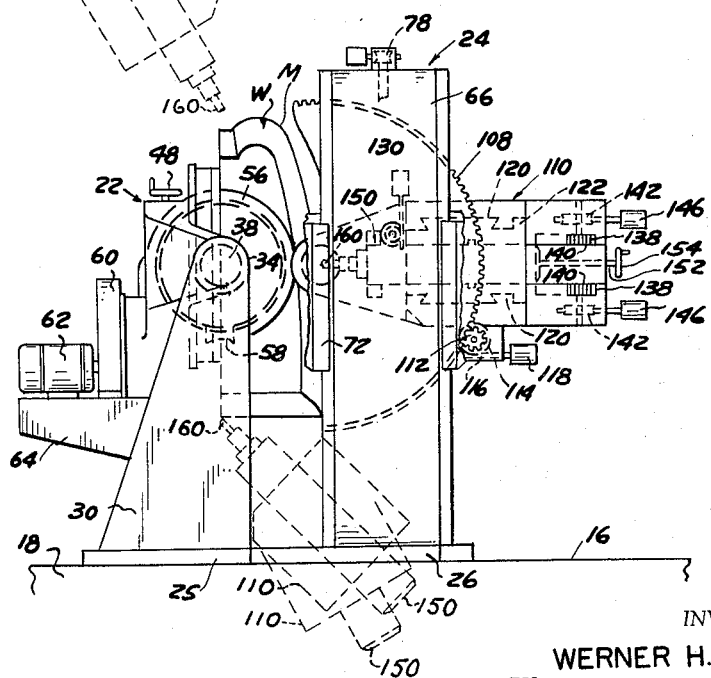
FIGURE 4 is a left-hand side elevation of the magnetic-tape-controlled tool shown in FIGURES 1 and 2, with the external control system likewise omitted, with the nearer column saddle cut away rearwardly to disclose the structure behind it, and with the maximum upper and lower working positions indicated in dotted lines.

Referring to the drawings in detail, FIGURE 1 shows a machine tool, generally designated 10, shown in top plan view as electrically connected to and controlled by the magnetic-tape-control system, generally designated 12. For convenience, the construction of the machine tool 10 will first be described, followed by the description of the magnetic-tape-control system 12 which collectively and cooperatively constitute the magnetic-tape-controlled machine tool, generally designated 14. Referring to FIGURES 2, 3 and 4, the machine tool 10 is mounted upon the top surface 16 of a foundation 18, such as concrete, in which is formed a shallow pit 20 which for convenience in one embodiment of the invention is fifteen feet long, eight feet wide and two feet deep. The machine tool 10 consists generally of two separate but cooperating assemblies or units, namely a workpiece or model-holding unit, generally designated 22 and a machining unit, generally designated 24 (FIGURES 2 and 4). These assemblies are mounted on and bolted, welded or otherwise firmly secured to a U-shaped base plate 25 having spaced arms 26 and 28 with the pit 20 disposed between them. The base plate 25 is firmly secured to the top surface 16 of the foundation 18, as by bolting it down thereto.

Secured as by welding or bolting to the base plates 26 and 28 and rising from them are two upright standards 30 and 32 (FIGURES 2 and 4) which at their upper ends are provided with journal bearing portions 34 and 36 which in turn rotatably support the opposite trunnions or pivot shafts 38 and 40 on the outer opposite ends of an offset rocking bridge 42, which is preferably provided with positive dowel stops (not shown) at its horizontal and vertical positions or otherwise with a circular engraved degree scale (not shown) registering with a zero index mark and vernier on the standard 30 or 32. Rotatably mounted on the flat inner or forward portion 44 of the rocking bridge 42 is the base 45 of a turntable 46 to which the workpiece or model W is secured. The turntable 46 is rotated upon an axis perpendicular to the axis of the trunnions 38 and 40 of the bridge 42 by a worm and worm wheel mechanism (not shown) within the bridge 42 rotated by a hand wheel 48 connected to the worm shaft 50. The periphery 52 of the turntable 46 is preferably provided with graduations (not shown) in degrees and minutes throughout its entire circumference to register with a zero index mark with a vernier on the turntable base 45. The face 54 of the turntable 46 is also preferably inscribed with a grid system (not shown) engraved upon it for initial lining up of the machine by means of a collimating telescope and front and rear targets coinciding with the 90-degree center line of the turntable 46, in order to establish the correct centering of the workpiece or model W and the zero position from which machining operations start. The workpiece or model W is mounted either directly on the face 54 or (not shown) on a separate mounting plate doweled and bolted thereto. The front face 54 of the turntable 46 is also provided with a set of T-slots (not shown) disposed at right angles to one another and not interfering with the engraved grid lines for the purpose of bolting the workpiece or model W thereto. In actual practice, grid lines 10 inches apart are provided on the front face 54 of the turntable 46.

Mounted on the trunnion 40 and drivingly connected thereto is a worm wheel 56 (FIGURE 4) with which meshes a worm 58 driven through a reduction gear box 60 from an electric bridge-swinging motor 62 which controls and effects swinging of the bridge 42 around the axis of its trunnions or pivot shafts 38 and 40 (FIGURE 2) and consequently varying the angle of tilt of the model or workpiece W mounted on the turntable 46. The electric motor 62 may be of the synchronous type or of the stepping type which executes rotation by steps in response to impulses received from the control system 12 in obedience to the instructions on the magnetic tape. The motor 62 is mounted on a shelf 64 (FIGURE 4) projecting rearwardly from the standard 32.

Also secured as by welding or bolting to the base plates 26 and 28 are two hollow columns 66 and 68 (FIGURES 2 and 3) disposed parallel to one another and provided on their adjacent faces with precisely-machine vertical guideways 70. Movable upward and downward upon the guideways 70 are two sliding saddles 72 and 74 threaded vertically to receive screwshafts 76 by the rotation of which the saddles 72 and 74 are moved upward and downward. This is accomplished by worm wheels 78 (FIGURE 3) drivingly secured to the upper ends of the screwshafts 76, the lower ends of which are journaled at 80 in the base plates 26 and 28. The worm wheels 78 are contained in gear cases 82 mounted on top of the columns 66 and 68 and providing upper bearing support for the screwshafts 76. Meshing with the worm wheels 78 within the gear cases 82 are worms 84 rotated by stepping motors 86 is response to impulses received from the control system 12, as described below. Secured to the saddles 72 and 74 are the lower ends of members 88, such as chains or cables, which pass over pulleys 90 mounted on axles 89 carried by brackets 91 extending upward from the tops of the columns 66 and 68. Connected to the opposite ends of the flexible members 88 are heavy counterweights 93 which counterbalance the weights of the saddles 72 and 74 and the structures carried by them. The counterweights 93 are housed within the hollow columns 66 and 68 and move upward and downward therein.

The saddles 72 and 74 are provided with horizontal guideways 92 along which move horizontal cross slides 94. The cross slides 94 are threaded horizontally to receive horizontal screwshafts 96 rotatably mounted on the saddles 72 and 74 and carrying worm wheels 98 rotated by worms 100 within gear cases 102 mounted on the rearward ends of the saddles 72 and 74. The worms 100 are drivingly connected to and rotated by stepping motors 104 (FIGURE 1 and 2) mounted on the saddles 72 and 74. Also mounted on the cross slides 94 are coaxial trunnions or pivot shafts 106 (FIGURES 1 and 2) with a common pivot axis 107. Mounted adjacent the shafts 106 and coaxial therewith are semi-circular bull gears 108 which are movable unitarily with the cross slides 94.

Pivotally mounted on the pivot shafts 106 is a horizontal swinging beam 110 which is adapted to be swung through an angle of approximately 180° by pinions 112 (FIGURES 3 and 4) meshing with the bull gears 108 and rotated by worm wheels 114, worms 116 and stepping motors 118 in response to impulses transmitted to them from the control system 12 according to instructions on the magnetic tape therein. The swinging beam 110 is provided with upper and lower dovetail guideways 120 (FIGURE 4) along which a cross carriage 122 is reciprocated by being threaded horizontally and transversely to receive a transverse screwshaft 124 (FIGURE 2) which is rotated by worm wheels 126 thereon driven by worms 128 rotated by stepping motors 130 in response to impulses transmitted thereto from the control system 12 as directed by the magnetic tape passing therethrough, as explained below.

The cross carriage 122 is provided with arcuate guideways 132 centered at a point 134 in space coincident with the pivot axis 107 of the swinging beam 110 and also with the tip of the end mill or other rotary cutting tool when taking a finishing cut on the workpiece or model W. In FIGURES 2 and 3, the cross carriage 122 is shown as moved to the right of its working position. Arcuately slidably mounted in the guideways 132, which consist of concentric arcuate grooves or ribs, is a cutter carriage 136. The cross carriage 122 adjacent the arcuate guideways 132 is provided with upper and lower arcuate gears or curved racks 138 fixed thereto. Meshing with the arcuate gears 138 are pinions 140 (FIGURE 4) rotated by worm wheels 142 driven by worms 144 (FIGURE 2) from stepping motors 146. The latter rotate in response to impulses received from the control system 14 as directed by the magnetic tape passing therethrough, as explained below. The cutter carriage 136 is provided with parallel radial guideways 148 (FIGURES 2 and 3) in which a tool slide 150 is movable toward and away from the workpiece or model W by means of a screwshaft 152 threaded therein and rotated by a hand wheel 154 (FIGURES 3 and 4). Mounted within the tool slide 150 is a hollow shaft or quill 156 (FIGURE 2) within which is rotatably mounted a rotary cutter shaft 158 on which a rotary cutting tool 160, such as an end mill, is mounted, as in a chuck or socket. As previously stated, the tip 162 of the rotary cutter or end mill 160 is so positioned by moving the tool slide 150 back and forth by means of the hand wheels 154 that in taking a finishing cut it lies at the center point 134 of the concentric arcuate guideways 132, and on the axis 107 of the trunnion or pivots shafts 106. The cutter shaft 158 is rotated by a so-called long-sleeve electric or hydraulic motor 164 concealed within the tool slide 150.

*Magnetic tape control system for machine tool*

The magnetic tape control system 12 by which the various motions of the machine tool 10 are actuated and controlled (FIGURE 1) includes a power source cabinet 170 which is electrically connected to an external source of electrical supply current and which is connected by electrical current distribution cables 172 and 174 to a magnetic tape reader 176 and junction or interconnection board or panel 178 respectively, the latter providing interchangeable connections and being frequently known as a patch board. The junction board 178 is in turn connected by electrical cables 180, 182 and 184 to the tape reader 176, to a motion-indicating or display panel 186 and to a control desk 188 respectively, the tape reader 176 also being directly connected by a cable 190 to the display panel 186. The display panel 186 contains travel-indicating instruments 192, 194, 196 and 198 which show the travel, in terms of steps or impulses, of the tip 162 of the cutting tool 160 (coincident with the point 134) from the origin or common point of intersection of the X, Y and Z coordinates or from a pre-adopted starting point spaced at a known distance from the origin of coordinates. Also provided on the display panel 186 are angle indicating instruments 200, 202 and 204, respectively which indicate the angles of inclination alpha, beta and gamma which the axis of the cutting tool 160 makes relatively to the X, Y and Z planes to maintain the tool axis radial or perpendicular to the point on the finished surface M being machined on the workpiece at any given instant, as explained below. The control desk 188 is also provided for the operator with controls and instruments 206, 208, 210 and 212 which show the number of steps traversed when the operator intentionally has adopted a starting point which is spaced away from the origin of the X, Y and Z coordinates. This has been explained in my above-mentioned co-pending application Serial No. 340,983 where the starting point of the photo-electric line follower's recording on the magnetic tape the X, Y and Z coordinates of the drawing line has also been commenced at a starting point spaced away from the origin of these coordinates.

From the display panel 186 and control desk 188, a common conductor cable 214 extends to the bridge-swinging motor 62 which actuates the swinging of the bridge 42 (FIGURE 2) and workpiece or model W around the horizontal axis of the pivot shafts 38 and 40 and thus vary its angle of inclination relatively to the axis of rotation of the cutting tool 160. This is the sole connection of the control circuit 12 to the workpiece or model-holding unit 22. The remainder of the connections thereof are to the machining unit 24. The impulses transmitted from the magnetic tape in the tape reader 176 to bring about vertical travel of the saddles 72 and 74 along the columns 66 and 68 for changing the path of cut of the cutting tool 160 in the direction of the X-coordinate axis from the starting point thereon across the surface M of the model or workpiece W as successive cuts are taken thereacross, are conducted by a branched cable 216 leading from an electrical connection with the X-axis instrument 206 on the control desk 188 to the stepping motors 86 which rotate the vertical screwshafts 76. The impulses transmitted from he magnetic tape in the tape reader 176 to bring about horizontal travel of the cross slides 94 along the saddles 72 and 74 toward and away from the model or workpiece W in the direction of the Z-coordinate axis from the starting point thereon is controlled by a branched cable 218 leading from an electrical connection with the Z-axis instrument 212 on the control desk 188 to the stepping motors 104 which rotate the horizontal screwshafts 96 to cause that motion.

The impulses transmitted from the magnetic tape in the tape reader 176 to bring about horizontal travel of the cross carriage 122 along the swinging beam 110 parallel to the pivot axis of the pivot shafts 48 and 40 of the bridge 42 carrying the workpiece or model W in the direction of the Y-coordinate axis in either of opposite directions from the starting point and designated as the $Y_1$ and $Y_2$ coordinates are conducted by a branched cable 220 leading from electrical connections with the $Y_1$ and $Y_2$ axis instruments 208 and 210 on the control desk 188 to the stepping motors 130 which cause that motion.

The angular inclination of the axis of the cutting tool 160 is determined by the angles alpha, beta and gamma as indicated at any given instant on the dials of the angle indicating instruments 200, 202 and 204. The angle alpha, which the axis of rotation of the cutting tool 160 makes with a horizontal plane, namely a plane in which the horizontal cross slides 94 move along their respective guideways 92, is determined by signals transmitted along a branched cable 222 leading from an electrical connection with the alpha angle indicating instrument 200 to the stepping motors 118 which rotate the pinions 112 and cause them to roll arcuately along the stationary semi-circular bull gears 108. The angle beta, which the axis of rotation of the rotary cutter 160 makes with a vertical plane through the cutter tip 162 or 134 coincident with it is determined by signals transmitted along a branched cable 224 leading from an electrical connection with the beta angle indicating instrument 202 to the stepping motors 146 which rotate the pinions 140 and cause them to roll along the arcuate gears or curved racks 138. These angles alpha and beta are indicated in FIGURES 5 and 6 and automatically determine the third angle gamma while these three angles are automatically indicated on the dials of the instruments 200, 202 and 204 as the machining operation of the cutting tool 160 upon the model or workpiece surface M.

Figure 5:
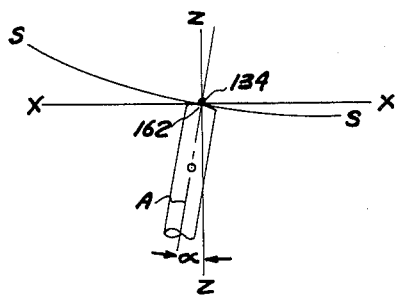
FIGURE 5 is a diagrammatic view showing the position required for the cutting tool in side elevation as shown in FIGURE 3, illustrating the vertical angle alpha of the axis of the cutting tool.
Figure 6:
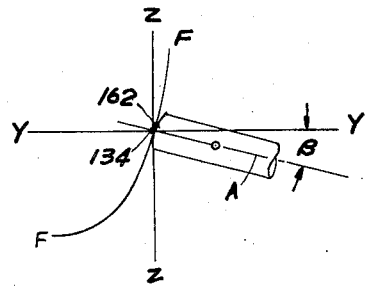
FIGURE 6 is a view similar to FIGURE 5, but showing the horizontal angle beta of the cutting tool as illustrated in FIGURE 1.

These angular relationships are shown in FIGURES 5 and 6, which are similar to FIGURES 2 and 3 in my above-mentioned copending application, Serial No. 340,-983. The same angular relationships must exist instantaneously between the axis of the cutting tool A as had existed between the axis A of the photoelectric line follower and the X, Y, Z coordinates which relationships in the said co-pending application were instrumental in producing the multichannel magnetic tape employed in the tape reader 176 in the present invention. The correspondence of angles alpha, beta and gamma is necessary so that the end mill or other cutting tools 160 will be constantly presented perpendicular or radial to the instantaneous point on a curved surface which may be constantly changing in contour. FIGURES 5 and 6 therefore show the angles alpha and beta of the axis A of the cutting tool 160 at any instant as corresponding points 134 occupied by the tip 162 on a finished surface of the workpiece or model W represented in side elevation by the line S—S in FIGURE 5 and in front elevation by the line F—F in FIGURE 6 respectively. The angle alpha in FIGURE 5 is the angle between the cutting tool axis A and the Z-axis, whereas the angle beta is the angle between the same cutting tool axis A and the Y-axis in FIGURE 6. These angles have been determined by the photoelectric line follower in scanning and following the corresponding lines of the drawing at corresponding instantaneous points thereon while making the magnetic tape as described in my above-mentioned co-pending application, Serial No. 340,983. The remaining angle gamma is determinable when the angles alpha and beta are known. The origin of the X–Y–Z coordinates lies on the axis 107 of the pivot shaft 106 and is always the apex of the angles alpha, beta and gamma, as well as the intersection of the cutter tip 162 at the center of rotation of the cutter 160 in making a finishing cut.

*Set-up procedure for magnetic-tape-controlled machine tool*

Along with the analog magnetic tape, the operator is furnished a process sheet giving macihne set-up and starting data. Among these is the approximate size of the workpiece or model in rough blank form, as well as its location on the turntable. Also specified thereon is the starting point in the X, Y and Z axes and the starting angles alpha, beta and gamma in relation to the starting point on the workpiece or model blank W. Also given on the process sheet are the bolt locations for the fastening of the workpiece or model to turn the table 46.

As previously stated, for set-up purposes the turntable 46 has a 10-inch grid system engraved upon it, and a pair of targets, front and rear, for use with a conventional collimating telescope has been provided, coinciding with the 90-degree centerlines of the turntable, in order to establish correct centerline of the workpiece or model W and for the zeroing of all counters. As previously stated also, the turntable periphery has been graduated in degrees and minutes and provided with vernier graduations, together with a positive dowel plug. At 0°, 90°, 180° and 270° a positive dowel plug has preferably been provided to assure perfect alignment, and on the turntable face 54 a set of T-slots at right angles to each other and not interfering with the 10" grid lines, has been provided. To facilitate set-up, the bridge 42 has been preferably provided with a positive dowel stop at the horizontal and vertical positions but at other angles the vernier and engraved degrees or graduations on the turntable periphery 52 facilitate any angular set-up that may be required.

A conventional collimating telescope with right angle viewer 230 (FIGURE 2) mounted coaxial with the pivot axis 107 of the horizontal carriage cross beam 110 is used for the set-up of the workpiece or model W and for exact positioning of the tip 162 of the cutter 160. A vertical reference surface and a horizontal reference surface for the purpose of measuring with standard height gauges are provided behind the bridge 42 which holds the turntable. These surfaces must be square with the guideways 70 on the uprights 66 of the machine 10 within .0005" and located an even number of inches from the centerline of the bridge 42, and should be located in positions not interfering with the total swing of the bridge 42, including the turntable 46 and the workpiece W. A conventional optical square (not shown) is also provided interchangeable with the cutter 160 to enable the collimating telescope 230 to focus at right angles from its line of sight 107 onto the turntable 46 and the two optical targets respectively mentioned above in describing the turntable 46, and also to ascertain the correct centerline of the mounted rough blank or unmachined workpiece or model W, thereby also facilitating checking the latter when the job has been completed.

After the bridge 42 has been swung into its horizontal position around its pivot shafts 38 and 40 by operating the motor 62, the rough model or unmachined workpiece W is swung into its proper position with an overhead traveling crane, assisted by the use of the collimating telescope in conjunction with the optical square. The operator now bolts the workpiece or model W securely to the turntable 46 or to a sub bolster plate which is doweled in the correct position, and by the aid of the motor 62 swings the bridge 42 to a vertical position opposite the power quill 156 holding the cutter 160. The hand wheel 50 is rotated to rotate the turntable 46 for further adjustment of the workpiece position.

The operator then removes the optical square, mounts the cutter 160 in the quill 156 and adjusts its length for the cut to be taken. For the roughing cut he positions the tip 162 of the cutter 160 one quarter inch away from the collimating telescope line representing the centerline of the cross beam 110, namely the pivot axis of the pivot shafts 106, whereas for the finishing cut he positions the cutter tip 162 on this exact centerline or pivot axis of the cross beam 110. As specified on the process sheet, the cross carriage 122 is now positioned so that the cutter tip 162 is located at the X, Y, Z coordinates of the starting point, and the stepping motors 118 and 146 are operated until the axis of rotation of the cutting tool 160 is disposed at the compound approach angle represented by the angles alpha, beta and gamma. With these conditions satisfied, the magnetic tape then takes over control of all functions.

*Operation*

The operation of the magnetic tape- controlled machine tool 14 has been largely described in connection with the construction thereof and hence is believed to require only a few additional words. The multi-channel magnetic tape made from drawings of side elevation, front elevation and top plan view in the apparatus and according to the method set forth in my above-mentioned copending application Serial No. 340,983 is placed in the tape feeder 176, which translates the instructions contained in the various channels of the magnetic tape into impulses which are transmitted by way of the display panel 186 and control desk 188 to the various electrical cables 216, 218, 220, 222 and 224 to the various stepping motors of the machine tool 10 to cause them to operate in obedience to these instructions.

If, as is usual, the corresponding starting points on the lines of the drawing do not coincide with the origin of the X, Y and Z co-ordinates but are located at assumed and known distances therefrom, recorded at the time the magnetic tape was made, the operator at the control desk 188 before instigating operation of the machine tool 10 causes impulses corresponding to these starting distances to be fed into the cables 216, 218 and 220 to cause the tip 162 of the rotary cutting tool 160 of the machine tool to commence its cutting operations at the same point in space corresponding to the starting point of linefollowing operations which determine the making of the tape. These starting impulses in setting up the machine 10 are indicated on the dials 206, 208, 210, 212 of the control desk 188.

The operator then starts the tape reader 176 in operation and as the cutting tool 160 is rotated by the motor within its slide 150, its axis is automatically tilted in response to instructions received from the magnetic tape in the form of electrical impulses through the angles alpha, beta and gamma which are instantaneously indicated upon the dials of the angle-indicating instruments 200, 202 and 204. At the same time, the distances, in terms of impulses, of the cutting tool tip 162 from the starting point are indicated in the instrument windows 192, 194, 196 and 198 so that the operator at the control desk 188 can constantly follow the operation.

When the first cuts have been completed and the crosscuts are begun to check the surface as to correct contour or configuration, any errors or irregularities immediately show up, as caused by errors in the information recorded on the analog magnetic tape. If the discrepancy is greater than the allowable error, the drafting room is informed, indicating which portion of the tape seems to be in error. This "feedback" effect is a valuable check on the accuracy of the engineering information furnished. The following procedure is carried out on the analog magnetic tape and darfting board in order to check the accuracy of the draftsman: The operator first ascertains which line in which view is the designed or determining line from which all surface development lines are generated. The three photo-electric line followers are then caused to retrace the same lines in the three views, according to the procedure set forth in my above-mentioned co-pending application Serial No. 340,983, whereupon the discrepancy in projection can be measured by checking the instantaneous positions of the other two line followers against the line follower following the "designed" or character lines. If the discrepancy of the projection made by the draftsman is too great, or will distort the smoothness of the contoured surface, or will not "fair" into adjacent surfaces, the apparatus and procedure of my said co-pending application Serial No. 340,983 which produces the analog magnetic tape for the machine of the present invention will pinpoint the error of the draftsman, and thereby will facilitate all such needed correction. In other words, what a template maker calls "stacking of templates" is done automatically and electronically under this proposed analog tape control by the cooperation of the present invention with my former invention set forth in my said co-pending application.

The majority of discrepancies and errors are made in such locations where three structural members form a corner so that the surface must flow around 90 degrees in more than one plane. The cooperation of the present invention with the system including the four photo-electric line followers set forth in my said co-pending application provides the means for quickly cutting a number of true, yet oblique, sections through such locations and thereby faciliatting the correction of drafting errors. This results in better fit of parts, ease of assembly, and sound spot welding of weldment components, such as vehicle bodies. After the draftsman has corrected his error, and a corrected line has been inscribed on the drawing, the corrected line is scanned by the line followers and the positions of its component points recorded on the tape by superimposing it thereon in place of the former erroneous signals. After the corrected analog magnetic tape has been received, the die model W is patched up with plastic and the surplus is shaved off by a re-run of the tape. The above steps thus insure a finished surface within very close tolerances to the drawing.

The impulses which represent the various motions to be transmitted from the magnetic tape to the various stepping motors are preferably square wave signals, each signal representing five ten-thousandths of an inch of motion so that a frequency of two thousand impulses per second inscribed on the magnetic tape and transmitted through the electric circuit to a motor would represent a motion of one inch per second or sixty inches per minute.

It will be understood that the same analog magnetic tape is used throughout the machining operations described above, from the taking of the rough cuts to the taking of the finishing cut if, as is usual, more than one cut is required in order to finish the machined surface of the workpiece. Each time a successive or additional cut is taken, the analog magnetic tape is again run through the tape reader 176. Such cuts preferably are taken in succession first in a horizontal direction across the entire face of the workpiece and then are taken in succession in a vertical direction thereacross. Moreover, should the operator find that the cutting speed appears to be great for the particular workpiece, he reduces the cutting speed merely by slowing down the speed at which the analog magnetic tape runs through the tape reader 176. Since all of the signals impressed upon the magnetic tape are recorded in parallel paths thereon and at truly corresponding instants of time, all speeds will be proportionately reduced for a given reduction in the speed of the analog magnetic tape in the tape reader 176. In this manner, the operator has full control over the feeding speeds of all motions of the cutting tool 160, so that one speed or motion can never get out of phase with the other speeds or motions. Thus, while the cutter 160 is being moved in a tangential direction relatively to the surface M of the workpiece W, its axis of rotation is automatically maintained radial or perpendicular to the tangent at each instantaneous point of contant of the cutting tool with the workpiece surface as the cutter 160 cuts layers of stock of uniform thickness in successive shells as each cut is completed over the surface M. Moreover, this special action according to the invention permits the finishing of workpieces or models W oversized or undersized in any desired amounts or increments as required, for example, in clearing of dies for the exact thickness of stock or for the acurate sizing of molds for the proper allowance of shrinkage of the material being molded.

What I claim is:

1. A magnetic tape-controlled machine for reproducing a predetermined configuration upon a workpiece in response to instructions recorded upon the magnetic tape by line-following operations upon corresponding views of the workpiece, said machine comprising a workpiece holding structure having means for mounting an unfinished workpiece thereon, an upright frame structure disposed in horizontally-spaced relationship to said workpiece holding structure, vertical slide mechanism mounted for vertical travel along said upright frame structure, vertical slide mechanism motive means operatively connected to said vertical slide structure for moving the same vertically along said upright frame structure, a horizontal transverse slide mounted for horizontal travel along said vertical slide toward and away from said workpiece holding structure, horizontal transverse slide motive means operatively connected to said horizontal transverse slide for moving the same toward and away from said workpiece holding structure, a horizontal cross support pivotally mounted on said horizontal transverse slide for swinging around a horizontal pivot axis, a horizontal cross carriage mounted on said cross support for horizontal travel therealong substantially parallel to said workpiece holding structure, horizontal cross carriage motive means operatively connected to said horizontal cross carriage for moving the same substantially parallel to said workpiece holding structure, a tool holding structure mounted on said horizontal cross carriage and including a power-driven rotary machining tool holder disposed adjacent said workpiece holding structure, a magnetic tape reader adapted to receive the multichannel magnetic machining instruction tape and transform the recordations thereon into electrical signal impulses, an electric circuit connecting said tape reader to the respective motive means corresponding to the several instruction channels of the magnetic tape for transmitting the electric impulses therefrom to said respective motive means whereby the axis of rotation of said rotary tool holder is constantly maintained by a predetermined compound angle relatively to reference co-ordinates in response to instructions transmitted thereto from said tape, said horizontal pivot axis of said horizontal cross support being disposed substantially coincident with the tip of the rotary machining tool in said rotary machine tool holder, and horizontal cross support swinging motive means connected to said electric circuit and operatively connected to said horizontal cross support for swinging said horizontal cross support around said horizontal pivot axis in response to electric impulses transmitted thereto from said tape reader.

2. A magnetic tape-controlled machine, according to claim 1, wherein said upright frame structure includes a pair of laterally-spaced uprights with parallel vertical guideways, and wherein said vertical slide mechanism includes a pair of vertical slides mounted for vertical sliding motion on said guideways.

3. A magnetic tape-controlled machine, according to claim 1, wherein said cross support swinging motive means includes a gear mounted on said horizontal transverse slide, a pinion rotatably mounted on said horizontal cross support in mesh with said gear, and an electric motor drivingly connected to said pinion and electrically connected to said electric circuit.

4. A magnetic tape-controlled machine, according to claim 2, wherein said tool holding structure is arcuately swingably mounted on said horizontal cross carriage for lateral swinging motion relatively thereto around an axis intersecting and substantially perpendicular to said horizontal pivot axis, and wherein there is provided tool holding structure swinging motive means connected to said electric circuit and operatively connected to said tool holding structure for swinging the same around said intersecting axis.

5. A magnetic tape-controlled machine, according to claim 4, wherein said tool holding structure swinging motive means includes an arcuate rack mounted on said horizontal cross carriage and centered on said intersecting axis, a pinion rotatably mounted on said tool holding structure in mesh with said arcuate rack, and an electric motor drivingly connected to said last-mentioned pinion and electrically connected to said electric circuit.

6. A magnetic tape-controlled machine, according to claim 4, wherein said tool holding structure also includes a tool slide mounted for radial motion toward and away from said intersecting axis, said rotary machining tool holder being mounted on said tool slide.

7. A magnetic tape-controlled machine, according to claim 6, wherein a rotary electric motor is mounted on said tool slide and drivingly connected to said rotary machining tool holder.

8. A magnetic tape-controlled machine, according to claim 1, wherein said vertical slide motive means includes a screw-shaft member and an internally-threaded member threaded thereon, and also includes an electric stepping motor electrically connected to said electric circuit and rotatingly connected to one of said members, the other member being fixedly mounted relatively thereto.

9. A magnetic tape-controlled machine, according to claim 1, wherein said horizontal transverse slide motive means includes a screwshaft member and an internally-threaded member threaded thereon and also includes an electric stepping motor electrically connected to said electric circuit and rotatingly connected to one of said members, the other member being fixedly mounted relatively thereto.

10. A magnetic tape-controlled machine, according to claim 3, wherein said electric motor is an electric stepping motor electrically connected to said electric circuit.

11. A magnetic tape-controlled machine, according to claim 5, wherein said electric motor is an electric stepping motor electrically connected to said electric circuit.

12. A magnetic tape-controlled machine, according to claim 1, wherein said workpiece holding structure includes a frame, a tilting support pivotally mounted on said frame, and mechanism for tilting said tilting support.

13. A magnetic tape-controlled machine, according to claim 12, wherein said workpiece holding structure includes power-driven tilting mechanism operatively connected to said tilting support.

14. A magnetic tape-controlled machine, according to claim 12, wherein said workpiece holding structure includes a workpiece holding turntable rotatably mounted on said tilting support upon an axis of rotation substantially perpendicular to the pivot axis of said tilting support.

15. A magnetic tape-controlled machine, according to claim 14, wherein said frame has pivots mounted thereon in horizontal alignment, and wherein said tilting support tilts upon the horizontal pivot axis of said horizontally-aligned pivots.

16. A magnetic tape-controlled machine, according to claim 12, wherein the pivot axis of said tilting support is disposed parallel to the horizontal pivot axis of said horizontal cross support.

No references cited.

WILLIAM W. DYER, JR., *Primary Examiner.*